United States Patent [19]
Imafuji et al.

[11] Patent Number: 5,771,407
[45] Date of Patent: Jun. 23, 1998

[54] DEVICE AND METHOD FOR PERFORMING COMMUNICATION IN A CAMERA BETWEEN A CAMERA BODY AND AN OPTICAL SYSTEM

[75] Inventors: Kazuharu Imafuji, Kawasaki; Nobuhiko Terui, Ichikawa, both of Japan

[73] Assignee: Nikon Corporation, Tokyo, Japan

[21] Appl. No.: 901,445

[22] Filed: Jul. 28, 1997

Related U.S. Application Data

[63] Continuation of Ser. No. 566,081, Dec. 1, 1995, abandoned.

[30] Foreign Application Priority Data

Dec. 14, 1994 [JP] Japan ..................................... 6-310485

[51] Int. Cl.$^6$ ................................................. G03B 17/00
[52] U.S. Cl. ................................ 396/55; 396/90; 396/91; 396/529
[58] Field of Search ................................ 396/52, 55, 90, 396/91, 529

[56] References Cited

U.S. PATENT DOCUMENTS 4,791,445  12/1988  Akada et al. ........................... 354/286
5,113,217  5/1992  Izumi et al. ............................ 354/286
5,220,375  6/1993  Ishida et al. ........................... 354/286

*Primary Examiner*—Russell E. Adams

[57] ABSTRACT

A camera with an optical system having an autofocus function and a motion compensation function and which is adapted to quickly perform communication of data relating to the motion compensation function and the autofocus function to a camera body. The camera is provided with a communication device having a body side control device, provided in the camera body, for controlling an autofocus adjustment device and a motion compensation device. The body side control device is adapted to issue a single command to request data regarding the optical system. An optical side control device is provided in the optical system, the optical side control device controls the autofocus adjustment device and the motion compensation device. The optical side control device transmits data relating to the autofocus adjustment device and to the motion compensation device to the body side control device based on the single command received from the body side control device.

22 Claims, 5 Drawing Sheets

| DATA | | COMMAND | | | | |
|---|---|---|---|---|---|---|
| | | A0 | A1 | A2 | A3 | A4 |
| | NAME | DRIVE STATUS | LENS STATUS 1 | MOTION COMPENSATION STATUS | IMAGE POSITION | LENS STATUS 2 |
| 1 | DRIVE STATUS DATA | ○ | | | | |
| 2 | AF STATUS | | ○ | | | ○ |
| 3 | COMMAND STATUS | | ○ | | | ○ |
| 4 | MOTION COMPENSATION STATUS | | | ○ | | ○ |
| 5 | MOTION COMPENSATION IMAGE POSITION | | | | ○ | |
| 6 | CENTER OF GRAVITY POSITION OF LENS | | | ○ | | ○ |
| 7 | LENS WEIGHT | | | ○ | | ○ |

FIG. 5

DEVICE AND METHOD FOR PERFORMING COMMUNICATION IN A CAMERA BETWEEN A CAMERA BODY AND AN OPTICAL SYSTEM

This application is a continuation of application No. 08/566,081, filed Dec. 1, 1995, now abandoned.

BACKGROUND OF THE INVENTION

1. Field of the Invention

The present invention relates to a camera having an optical system with a motion compensation device which compensates for vibrations such that image blur does not occur on an image forming plane of the camera and an autofocus device which focuses the image on the image forming plane. More specifically, the invention relates to a device and method for performing communication regarding the motion compensation device and the autofocus device between a camera body and the optical system.

2. Description of the Related Art

Image blur suppression devices have as their object, suppression of, or reduction of, blurring of an image projected onto an image plane. A motion compensation device is a type of image blur suppression device which compensates for motion incident upon an optical system which projects the image onto the image plane. Motion is typically imparted to the optical system by way of vibrations in the optical system, or in the surrounding holding member. In general, known motion compensation devices cause a compensation lens to shift counter to the motion of the optical system so as to shift the image projected by the optical system relative to the optical system.

In recent cameras, there has been significant progress toward making various optical functions highly automated, for example an autoexposure device and an autofocus device. Further attempts have been made to automate a motion compensation device (also sometimes known as a shake or vibration compensation device), which compensates for the image blur which results from camera vibration, such as that which occurs during hand-held photography.

A camera with a motion compensation function generally comprises a camera body, a vibration detector, which uses the angular velocity and acceleration of a camera to detect vibrations, a motion compensation optical system, provided inside a lens barrel, which moves within a plane perpendicular to the optical axis of a main optical system, a computation unit, such as a microcomputer, which computes the compensation value for compensating a photographic optical path based on the output of the vibration detector so that the image inside the image forming plane becomes stationary, and a driver, such as an electric motor, which moves the motion compensation optical system up, down, left and right based on the computation results of the computation unit. In such a camera, the camera body performs photographic control by obtaining characteristic data and status data regarding a lens by communicating with the lens barrel. Communication between the camera body and the lens barrel typically involves exchanging signals through a serial communication device. That is, the camera body transmits commands corresponding to the required data to the lens barrel, and the lens barrel transmits data corresponding to the commands received to the camera body.

However, in known motion compensation devices, when the camera body transmits commands requesting data from the lens barrel, commands which request data relating to autofocus and commands which request data relating to motion compensation are sent separately. This allows the camera to be used with lens barrels which are equipped with a motion compensation device and with lens barrels which are not equipped with a motion compensation device.

When data relating to both autofocus and motion compensation are required, the camera body must transmit separate commands corresponding to the autofocus data and to the motion compensation data. Conversely, the camera body also must separately receive data corresponding to the respective commands. This multiplicity of communication unacceptably increases the time required for the data and commands to be transmitted.

SUMMARY OF THE INVENTION

Accordingly, it is an object of the present invention to provide a camera with a motion compensation function which is able to quickly communicate data relating to a motion compensation function and an autofocus function between the camera body and the lens barrel.

It is also an object of the present invention to provide a camera wherein when the camera body transmits to the lens barrel a single command which corresponds to data relating to both autofocus and motion compensation.

Additional objects and advantages of the invention will be set forth in part in the description which follows, and, in part, will be obvious from the description, or may be learned by practice of the invention.

Objects of the present invention are achieved in a camera having an autofocus adjustment device and a motion compensation device, the motion compensation device for detecting camera vibration and changing the optical axis of a lens to compensate for image blur. The camera comprises a body side control unit attached to the camera body which controls at least part of the autofocus adjustment device and the motion compensation device, a lens side control unit attached to the lens barrel which controls at least part of the autofocus adjustment device and the motion compensation device, and a communication unit connecting the body side control unit and the lens side control unit, wherein the lens side control unit transmits data relating to the autofocus adjustment device and data relating to the motion compensation device to the body side control unit based on one command received from the body side control unit.

Objects of the present invention are also achieved in a communication device for an optical device having a body and an optical system with an autofocus device and a motion compensation device, the communication device comprising a main control device that controls the autofocus device and the motion compensation device, the main control device being adapted to issue a command to request data regarding the optical system, and an optical side control device, provided in the optical system, that controls the autofocus device and the motion compensation device, the optical side control device transmitting data relating to the autofocus device and the motion compensation device to the main control drive based on a single command received from the main control device.

Objects of the present invention are further achieved in a communication device for a camera having a camera body and an optical system with an autofocus device and a motion compensation device, the communication device comprising a body side control device provided in the camera body, that controls the autofocus device and the motion compensation device, the body side control device being adapted to issue a command to request data regarding the optical system, and an optical side control device, provided in the optical system, that controls the autofocus device and the motion compensation device, the optical side control device transmitting data relating to the autofocus adjustment device and to the motion compensation device to the body side control device based on a single command received from the body side control device.

Objects of the present invention are also achieved in a camera comprising a camera body, an optical system attached to the camera body having at least one optical function, a first control device that controls at least a portion of the at least one optical function, the first control device adapted to issue a single command to request data regarding each of the at least one optical function, and a second control device interfacing with the first control device and controlling at least a portion of the at least one optical function, the second control device adapted to transmit data regarding each of the at least one optical function in response to the single command.

Objects of the present invention are further achieved in a method of obtaining data from an optical side control unit of an optical system regarding at least one optical function of the optical system, the method comprising transmitting a single command requesting the data from the optical side control unit, the command based on the optical functions provided in the optical system, and receiving data from the optical side control unit regarding each of the functions provided in the optical system.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 5 is a diagram that shows the relationship between the commands transmitted to the lens barrel by the camera body of a camera having a communication device in accordance with a preferred embodiment of the present invention.

DESCRIPTION OF THE PREFERRED EMBODIMENTS

Figure 1:
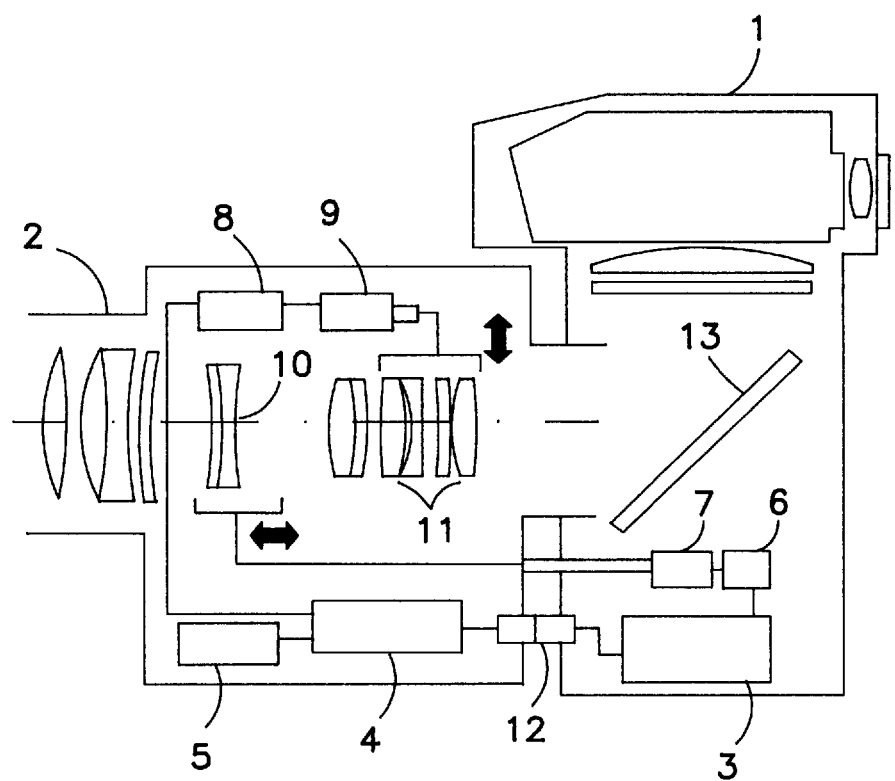
FIG. 1 is a cross-sectional diagram of a camera having a communication device in accordance with a preferred embodiment of the present invention.

Reference will now be made in detail to the present preferred embodiments of the present invention, examples of which are illustrated in the accompanying drawings, wherein like reference numerals refer to like elements throughout.

Figure 2:
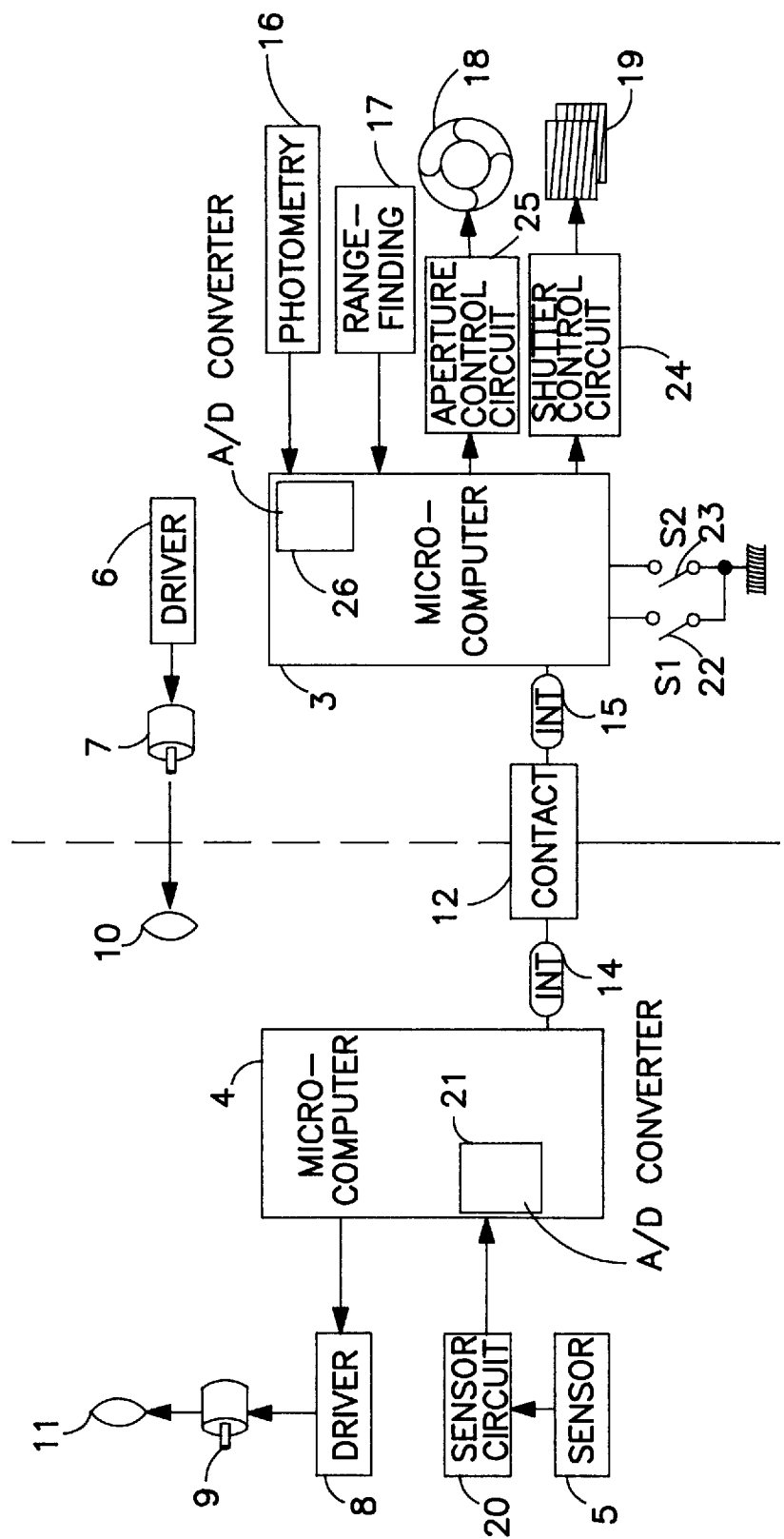
FIG. 2 is a block diagram of a camera having a communication device in accordance with a preferred embodiment of the present invention.

FIG. 1 is a cross-sectional diagram of a camera having a communication device in accordance with a preferred embodiment of the present invention. FIG. 2 is a block diagram of a camera having a communication device in accordance with a preferred embodiment of the present invention. The camera generally comprises a camera body 1 and a lens barrel 2. The lens barrel 2 can be attached to and removed from the camera body 1.

The camera body 1 is provided with a microcomputer 3 for controlling the photographic operations of the camera and an AND converter 26 which converts analog signals into digital signals. The microcomputer 3 receives signals from a photometric element 16, a rangefinding element 17, a half-press switch 22 ("S1"), and a full-press switch 23 ("S2").

The photometric element 16 detects photographic subject brightness information. The output signal of the photometric element 16 is connected to the microcomputer 3 via the A/D converter 26. The rangefinding element 17 measures the distance to the subject to be photographed. The half-press switch (S1) 22 is turned ON by pressing a release button (not shown) halfway, and the full-press switch (S2) 23 is turned ON by fully pressing the release button.

The output signal of microcomputer 3 is connected to an aperture 18 via an aperture control circuit 25, and to a shutter 19 via a shutter control circuit 24. The shutter control circuit 24 performs drive control of the front and rear blinds of the shutter 19. The aperture control circuit 25 drives and controls the stopping down and release of the aperture 18.

The output signal of the microcomputer 3 is also connected to an autofocusing ("AF") lens drive motor 7 via a driver 6. The AF lens drive motor 7 drives an AF lens 10 of the lens barrel 2.

The lens barrel 2 is provided with a microcomputer 4 for performing lens drive control. An angular velocity sensor 5 is connected to the microcomputer 4 via a sensor circuit 20. The angular velocity sensor 5 detects the angular velocity of vibrations generated by camera vibration. A sensor circuit 20 filters the high frequency component of the output of the angular velocity sensor 5 and amplifies the resultant signal. The output of the sensor circuit 20 is connected to an A/D converter 21 which is in turn connected to the microcomputer 4. The AID converter 21 converts the analog signals from the sensor circuit 20 into digital signals.

The microcomputer 4 is connected to a vibration compensation motor 9 via a driver 8. The vibration compensation motor 9 drives a vibration compensation lens 11. The vibration compensation lens 11 is supported so that it can move up and down (and left and right) to compensate for image blur in the image forming plane resulting from camera vibration.

The microcomputer 3 and the microcomputer 4 exchange signals via an interface 15, a contact 12 and an interface 14. The microcomputer 3 receives characteristic parameters and status data of the components in the lens barrel 1 from the microcomputer 4. The microcomputer 4 receives signals, such as those for the status of the camera body 1 and the START and END of vibration compensation from the microcomputer 3. Communication between microcomputer 3 and microcomputer 4 is performed using commonly known serial communication apparatus.

Figure 3:
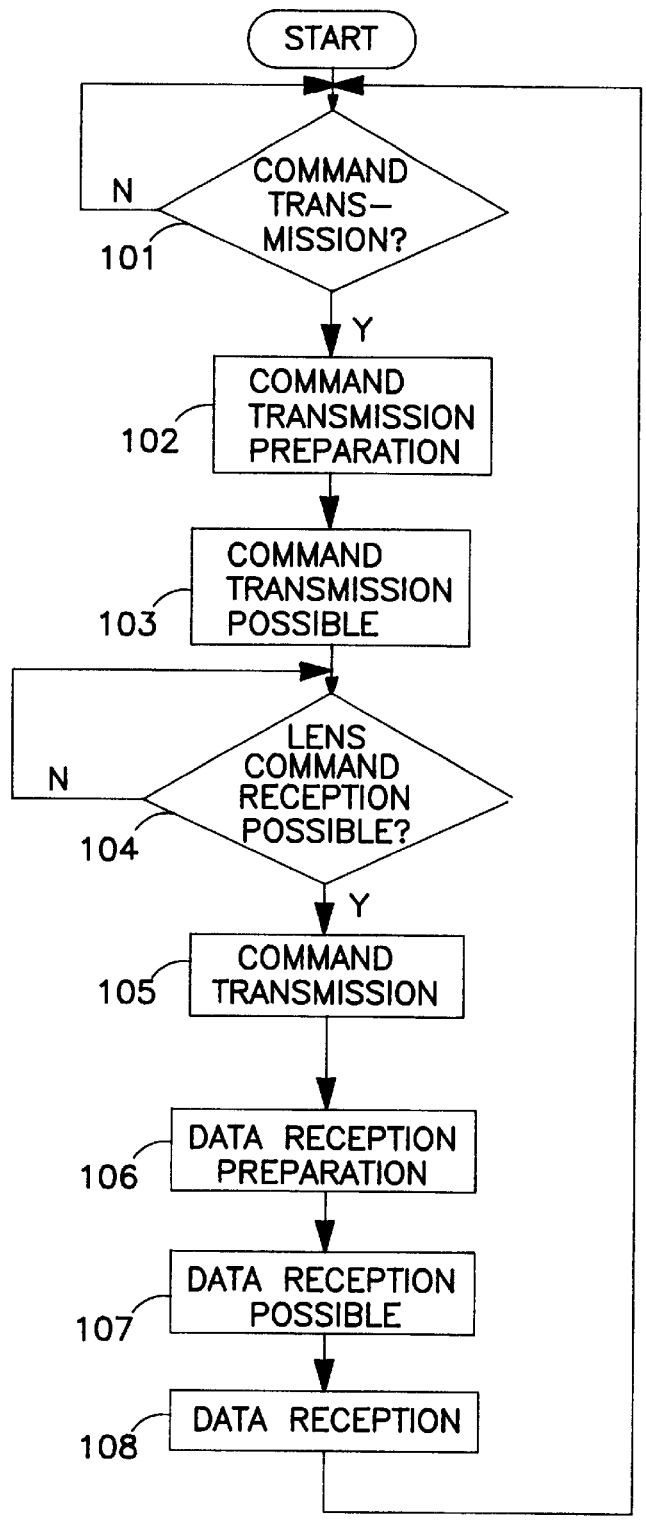
FIG. 3 is a flow chart showing a camera body side communications operation of a camera having a communication device in accordance with a preferred embodiment of the present invention.

FIG. 3 is a flow chart showing a camera body side communications operation of a camera having a communication device in accordance with a preferred embodiment of the present invention. In step 101, the microcomputer 3 decides whether to transmit commands, corresponding to, i.e. requesting, the characteristic parameters and status data from the microcomputer 4, which are required by the camera body 1. If the microcomputer 3 decides to initiate transmission the operation proceeds to step 102.

In step 102, the microcomputer 3 prepares for command transmission to the lens barrel 2. Thereafter, in step 103, microcomputer 3 transmits the fact that command transmission is possible to the lens barrel 2, i.e. the microcomputer 4. In step 104, the microcomputer 3 waits until the lens barrel 2 is able to receive commands. If the lens barrel 2 can receive commands the operation proceeds to step 105.

In step 105, the microcomputer 3 transmits commands to the lens barrel 2. In step 106, the microcomputer 3 prepares to receive data, corresponding to the commands, transmitted from the lens barrel 2. In step 107, the microcomputer 3 transmits to the lens barrel 2 the fact that it is possible to receive data, which corresponds to the commands, transmitted from the lens barrel 2. In step 108, the microcomputer 3 receives data, which corresponds to the commands, from the lens barrel 2.

Figure 4:
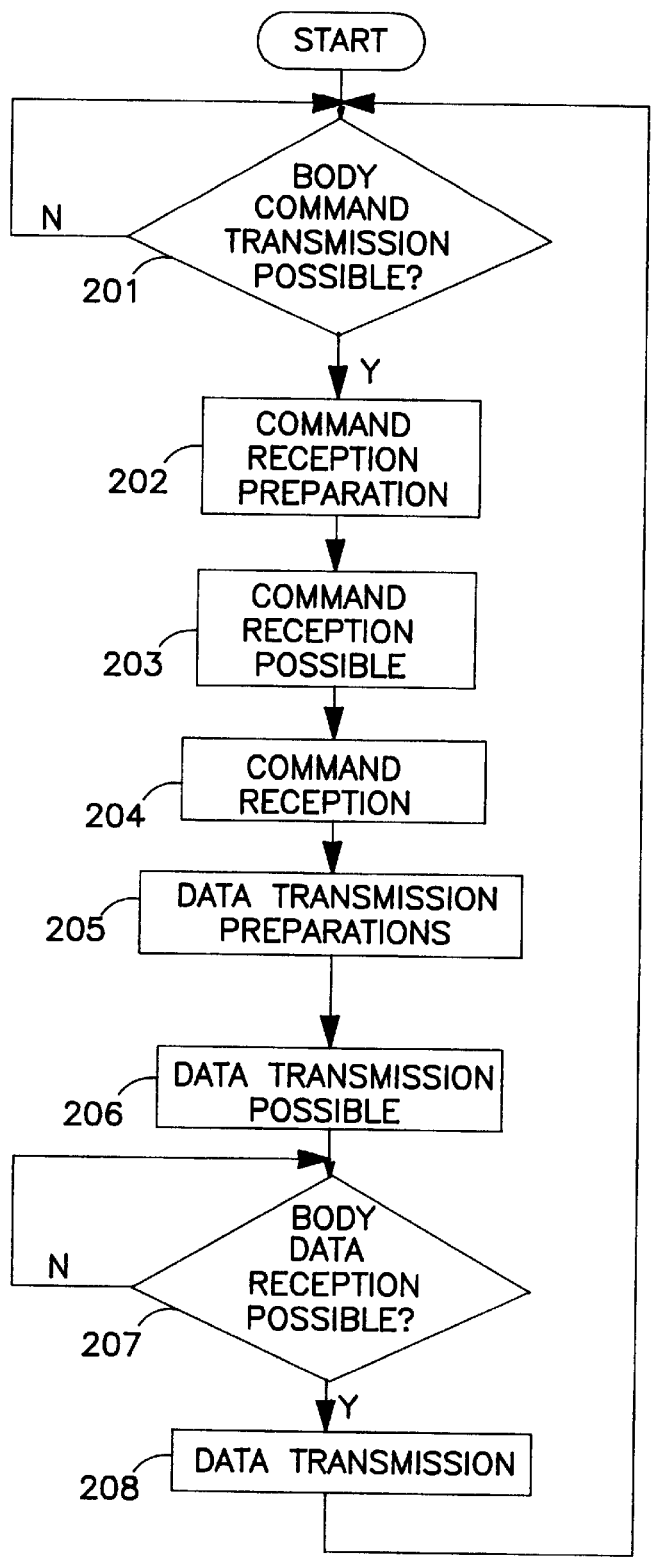
FIG. 4 is a flow chart showing a lens barrel side communications operation of a camera having a communication device in accordance with a preferred embodiment of the present invention.

FIG. 4 is a flow chart showing a lens barrel side communications operation of a camera having a communication device in accordance with a preferred embodiment of the present invention. In step 201, the microcomputer 4 makes a determination as to whether command transmission from the camera body 1 is possible. If command transmission is possible, the operation proceeds to step 202.

In step 202, the microcomputer 4 prepares to receive commands. In step 203, the microcomputer 4 transmits the fact that command reception is possible to the camera body 1, i.e. the microcomputer 3. In step 204, the microcomputer 4 receives commands from the camera body 1. In step 205, the microcomputer 4 prepares for the transmission of data, corresponding to the commands transmitted, to the camera body 1. In step 206, the microcomputer 4 transmits to the camera body 1 the fact that it is possible to transmit data, corresponding to the commands transmitted, from the camera body 1. In step 207, the microcomputer 4 waits until it is possible for the camera body 1 to receive data, and thereafter the operation proceeds to step 108. In step 108, the microcomputer 4 transmits data to the camera body 1.

FIG. 5 is a diagram that shows the relationship between the commands transmitted to the lens barrel by the camera body of a camera having a communication device in accordance with a preferred embodiment of the present invention. Data 1 is drive status data which relates to the drive status and position of the autofocus lens 10. Data 2 is AF status data which relates to the focus motor 7 status and to the autofocus function. Data 3 is command status data which relates to the reception and execution status of commands transmitted to the lens barrel 2 from the camera body 1. Data 4 is motion compensation status data relating to the drive status and position of the vibration compensation lens 11 and to the motion compensation function. Data 5 is motion compensation image position data relating to the motion compensation image position resulting from the vibration compensation lens 11. Data 6 is center of gravity of lens position data which indicates the center of gravity of the lens barrel 2. Data 7 is lens weight data which indicates the weight of the lens barrel 2. Data 1 through 3 are mainly related to autofocus. Data 4 through 7 are mainly related to motion compensation.

When commands A0 through A4 are transmitted from the camera body 1 to the lens barrel 2, subsets data 1 through 7 are transmitted from the lens barrel 2 to the camera body 1 in accordance with FIG. 5. For example, when the motion compensation status command, i.e. command A2, is transmitted from the camera body 1 to the lens barrel 2, the lens barrel 2 transmits the motion compensation status data, i.e. data 4, the center of gravity of the lens position data, i.e. data 6, and the lens weight data, i.e. data 7, to the camera body 1. Commands A0 and A1 relate to autofocus. Commands A2 and A3 relate to motion compensation. Command A4 relates to both autofocus and motion compensation.

When a lens barrel, not equipped with a motion compensation function, is attached to the camera body 1, the camera body 1 uses commands A0 and A1. In response, the lens barrel transmits data which corresponds to the respective commands to the camera body 1. When a lens barrel which is equipped with a motion compensation function is attached to the camera body 1, the camera body 1 uses commands A0 through A4. In response, the lens barrel 2 transmits data which corresponds to the respective commands to the camera body 1.

The data which corresponds to command A4 relates to both autofocus and motion compensation, so when both the AF status of data 2 and the motion compensation status of data 4 are necessary, the necessary data can be obtained by only transmitting the command A4, even if command A1 and command A2 are not transmitted.

Although a preferred embodiments have been shown and described, it would be appreciated by those skilled in the art that changes may be made in these embodiments without departing from the principles and spirit of the invention, the scope of which is defined in the claims and their equivalents. Further, one of ordinary skill in the art will recognize that while the preferred embodiments have been shown and described as being used within an optical camera, they may be adapted for use in any device in which it is desirable to suppress blurring of an image-formed by an optical system, for example, in camcorders, motion picture cameras, telescopes, binoculars, microscopes, range finding equipment, lasers, fiber optic communication systems, various optical projection systems and CD mastering systems.

What is claimed is:

1. A communication device for an optical device having a body and an optical system with an autofocus device and a motion compensation device, the communication device comprising:

a main control device that controls the autofocus device and the motion compensation device, said main control device being adapted to issue a first command to request data regarding the optical system from the autofocus device a second command to request data regarding the optical system form the motion compensation device and a third command to request data regarding the optical system from the autofocus device and the motion compensation device; and an optical side control device, provided in the optical system, that controls the autofocus device and the motion compensation device, said optical side control device transmitting data relating to the autofocus device and the motion compensation device to the main control device based on which command is received from the main control device.

2. A communication device, as set forth in claim 1, further comprising:

a communication device that connects said main control device and said optical side control device.

3. A communication device, as set forth in claim 2, wherein said communication device is a serial communication device.

4. A communication device, as set forth in claim 1, wherein said optical system is housed in a lens barrel.

5. A communication device, as set forth in claim 4, wherein said main control device is housed in a body to which the lens barrel is attached.

6. A communication device for a camera having a camera body and an optical system with an autofocus device and a motion compensation device, the communication device comprising:

a body side control device, provided in the camera body, that controls the autofocus device and the motion compensation device, said body side control device being adapted to issue a first command to request data regarding the optical system from the autofocus device a second command to request data regarding the optical system from the motion compensation device and a third command to request data regarding the optical system from the autofocus device and the motion compensation device; and an optical side control device, provided in the optical system, that controls the autofocus device and the motion compensation device, said optical side control device transmitting data relating to the autofocus adjustment device and to the motion compensation device to the body side control device based on which command is received from the body side control device.

7. A communication device, as set forth in claim 6, wherein said optical system is housed in a lens barrel.

8. A communication device, as set forth in claim 7, wherein said lens barrel is detachable.

9. A communication device, as set forth in claim 8, further comprising:

a communication device that connects said body side control device and said optical side control device when said lens barrel is attached to the camera body.

10. A communication device, as set forth in claim 9, wherein said communication device provides a serial data path between said body side control device and said optical side control device.

11. A camera comprising:

a camera body;

an optical system attached to said camera body having a plurality of optical functions;

a first control device that controls a first and a second optical function, said first control device adapted to issue a first command to request data regarding the first optical function, a second command to request data regarding the second optical function and a third command to request data regarding the first and second optical functions; and a plurality of auxiliary control devices interfacing with said first control device and controlling the first and second optical functions, each of said auxiliary control devices adapted to transmit data regarding the optical function for which they are responsible in response to the first, and second and third commands.

12. A camera, as set forth in claim 11, wherein said first control device is positioned inside said camera body.

13. A camera, as set forth in claim 11, wherein said optical system is positioned inside a lens barrel.

14. A camera, as set forth in claim 13, wherein said second control device is positioned inside the lens barrel.

15. A camera, as set forth in claim 11, wherein the at least one optical function comprises an autofocus function and a motion compensation function.

16. A camera, as set forth in claim 11, further comprising:

a communication unit providing a serial communications path between said first control device and said second control device.

17. A method of obtaining data from an optical side control unit of an optical system regarding a plurality of optical functions of the optical system, the method comprising:

transmitting one of a first command requesting the data from the optical side control unit about a first optical function, a second command requesting the data from the optical side control unit about a second optical function, and a third command requesting the data about the first and second optical functions from the optical side control unit; and receiving data from the optical side control unit regarding the functions provided in the optical system based on which command was transmitted.

18. A method, as set forth in claim 17, wherein the single command is selected from multiple commands, each of the multiple commands relating to a different subset of data regarding the optical functions.

19. A method, as set forth in claim 17, wherein the optical functions at least includes an autofocus function and a motion compensation function.

20. A camera comprising:

a lens having:
an optical system;
an AF drive unit;
a motion compensation drive unit; and
a first control unit to monitor the optical system, the AF drive unit and the motion compensation drive unit;

a body having:
a second control unit to control the camera, the second control unit issuing a first command to the first control unit to obtain AF status data, a second command to the first control unit to obtain motion compensation status data, and a third command obtain AF status data and motion compensation status data.

21. A camera, as set forth is claim 20, wherein the first command also obtains drive status data and command status data; the second command also obtains center of gravity position of the lens data and lens weight data; and the third command also obtains drive status data, center of gravity position of lens data, and lens weight data.

22. A camera, as set forth in claim 20, wherein the second control unit also issues a fourth command to obtain drive status data and a fifth command to obtain motion compensation image position data.

* * * * *